June 9, 1931. W. STANIEWICZ 1,809,737
DRIVING MECHANISM FOR MOTOR VEHICLES
Filed Jan. 25, 1930 2 Sheets-Sheet 2

Inventor
Willy Staniewicz
by P. W. Dahm,
Attorney.

Patented June 9, 1931

1,809,737

UNITED STATES PATENT OFFICE

WILLY STANIEWICZ, OF BRUNSWICK, GERMANY, ASSIGNOR TO AUTOMOBILWERKE H. BUSSING, AKTIENGESELLSCHAFT, OF BRUNSWICK, GERMANY

DRIVING MECHANISM FOR MOTOR VEHICLES

Application filed January 25, 1930, Serial No. 423,462, and in Germany December 3, 1928.

My invention relates to improvements in the driving mechanism for motor vehicles, and more particularly for motor vehicles having a plurality of driving axles (e. g., of the type shown in Patent No. 1,733,032) and a gearing intermediate the change speed gearing and the driving axles for transmitting the movement to the driving axles at different gear ratios. As now constructed mechanism of this type comprises a gearing for transmitting the power from the engine at two different gear ratios and gearing for transmitting the power from the first-named gearing to the driving axles. The object of the improvements is to provide mechanism of this type which is more simple in construction, and with this object in view my invention consists in providing a gearing intermediate the driving shaft connected with the engine and the driving axles, which consists of two gearings connected respectively with the axles and adapted to be alternately connected to the driving shaft, and each comprising gear wheels for transmitting the power at different gear ratios. By means of the said mechanism the vehicle can be driven under full load either at normal velocity or at higher velocity without increasing the number of revolutions of the engine beyond the normal.

Figure 1:
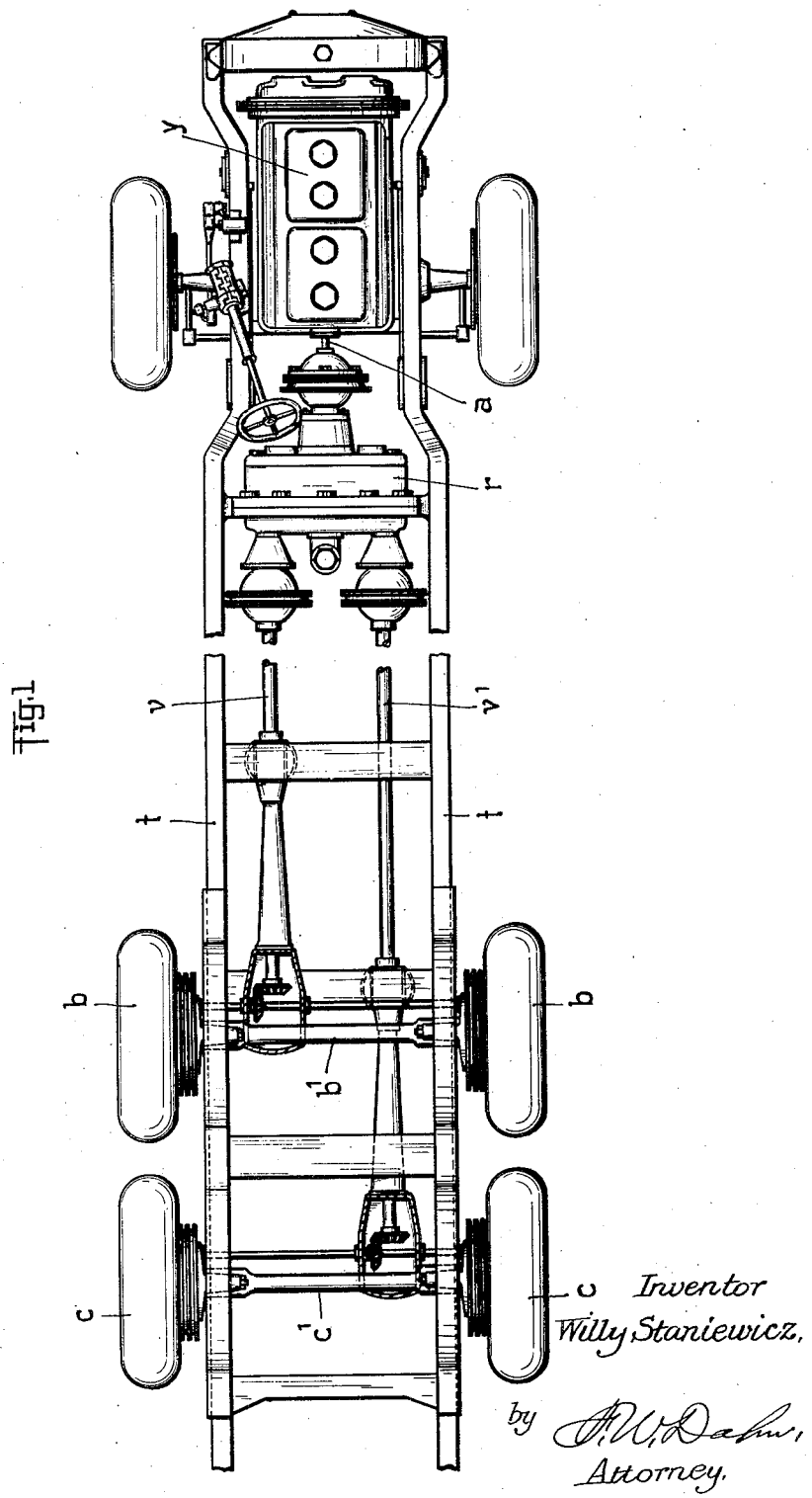
Figure 2:
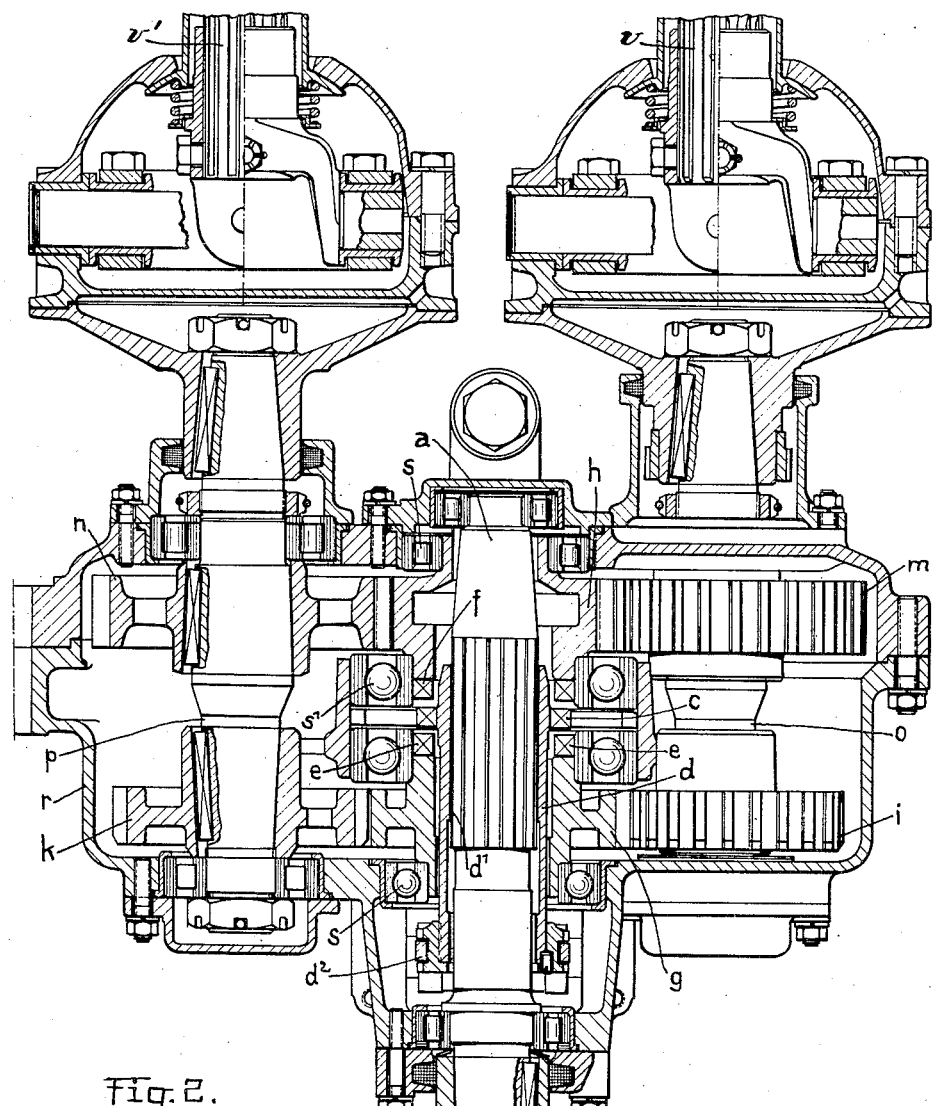

For the purpose of explaining the invention an example embodying the same has been illustrated in the accompanying drawings in which Fig. 1 is a sectional plan view of a motor vehicle having a plurality of driving axles and Fig. 2 is a similar view of the transmission gearing.

In the drawings, reference characters $b$, $b$ indicate a set of driving wheels on an axle $b'$, and reference characters $c$, $c$ indicate another set of driving wheels on another axle $c'$, the axles being mounted in suitable bearings connected to the chassis $t$ in any suitable manner. The two axles are driven respectively from a single motor $y$ by transmission shafts $v$, $v'$, as in German Patent 398,674, either transmission shaft and its respective distribution shaft $o$ or $p$ being driven independently from driving shaft $a$.

In the example shown in the drawings the gearing is disposed within a casing $r$ having a driving shaft $a$ and driven shafts $o$ and $p$ mounted therein, the driven shafts $o$ and $p$ being located with their inner ends at opposite sides of the driving shaft $a$. On the inner end of the driving shaft $a$ a longitudinally shiftable coupling sleeve $d$ is mounted, the said driving shaft and sleeve being connected with each other by means of longitudinal ribs and grooves $d^1$. For shifting the sleeve in axial direction a ring $d^2$ is provided which is connected with suitable operating mechanism (not shown). Coaxially of the shaft $a$ and the sleeve $d$ two gear wheels $g$ and $h$ are mounted in anti-friction bearings $s$ and $s^1$, the outer race rings of the anti-friction bearings $s$ being fitted in bores of the wall of the casing $r$, and the outer race rings of the anti-friction bearings $s^1$ being mounted in a ring secured to or made integral with the casing $r$. The gear wheels $g$ and $h$ are in mesh respectively with gear wheels $i$, $m$ and $k$, $n$ secured respectively to shafts $o$ and $p$, and the gear ratios of the gear wheels $g$, $i$, $k$ and $h$, $m$, $n$ are different, the gear wheels $g$, $i$ and $g$, $k$ transmitting power to the shafts $o$ and $p$ at higher velocity than the gear wheels $h$, $m$ and $h$, $n$. The hubs of the gear wheels $g$ and $h$ are formed with coupling teeth $e$ and $f$ adapted for coupling engagement with coupling teeth $c$ carried by the sleeve $d$. Thus, by axially shifting the sleeve $d$ forwardly or rearwardly the driving shaft $a$ is coupled either with the gear wheel $g$ or with the gear wheel $h$ for transmitting power to the driven shafts $o$ and $p$ at high or low velocity.

The driving shaft is connected with the engine, and the driven shafts $o$ and $p$ are connected respectively with the axles of the driving wheels.

When shifting the sleeve $d$ into coupling engagement with the gear wheel $g$ the driving shafts of the vehicle are driven through the intermediary of the gear wheels $i$ and $k$ of equal diameter at normal velocity, and if it is desired to drive the driving shafts at higher velocity, the sleeve $d$ is shifted with its coupling teeth $c$ into engagement with the coupling teeth $f$ of the gear wheel $h$, so that power is transmitted through the large gear wheels m and n of even diameter.

While in describing the invention reference has been made to a particular example embodying the same I wish it to be understood that my invention is not limited to the construction shown in the drawings, and that various changes may be made in the general arrangement of the apparatus and the construction of its parts without departing from the invention.

I claim:

1. In a motor vehicle, the combination with a driving shaft and two driven axles, of two driven shafts each connected with a driven axle, gearings of different gear ratios each connecting said driving shaft to the driven shafts each set comprising a gear on the driving shaft and a gear for each driven shaft constantly in driving relation with said gear on the driving shaft, and coupling means for said gearings adapted to be shifted to connect one or the other of said gearings to the axles for driving the same.

2. In a motor vehicle, a driving shaft, a pair of axles, a pair of driven shafts each connected to an axle of the vehicle, gearings of different ratios each connecting the driving shaft to both of the driven shafts each gearing including a gear loose on the driving shaft, and a clutch element on said shaft between said loose gears, said clutch element being secured to the driving shaft to rotate therewith and being movable axially of said shaft into engagement with either of said loose gears for changing the speed of the vehicle.

In testimony whereof I affix my signature.

WILLY STANIEWICZ.